Oct. 4, 1966  R. A. THIES  3,276,240
SPEED COMPARATOR
Filed July 23, 1963  3 Sheets-Sheet 1
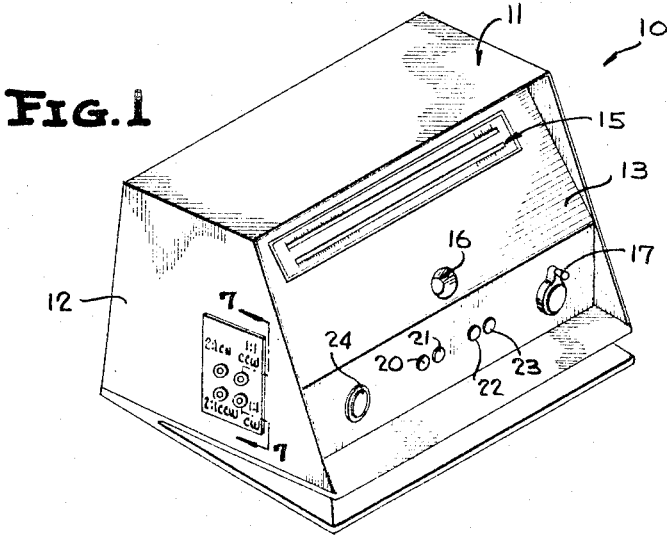
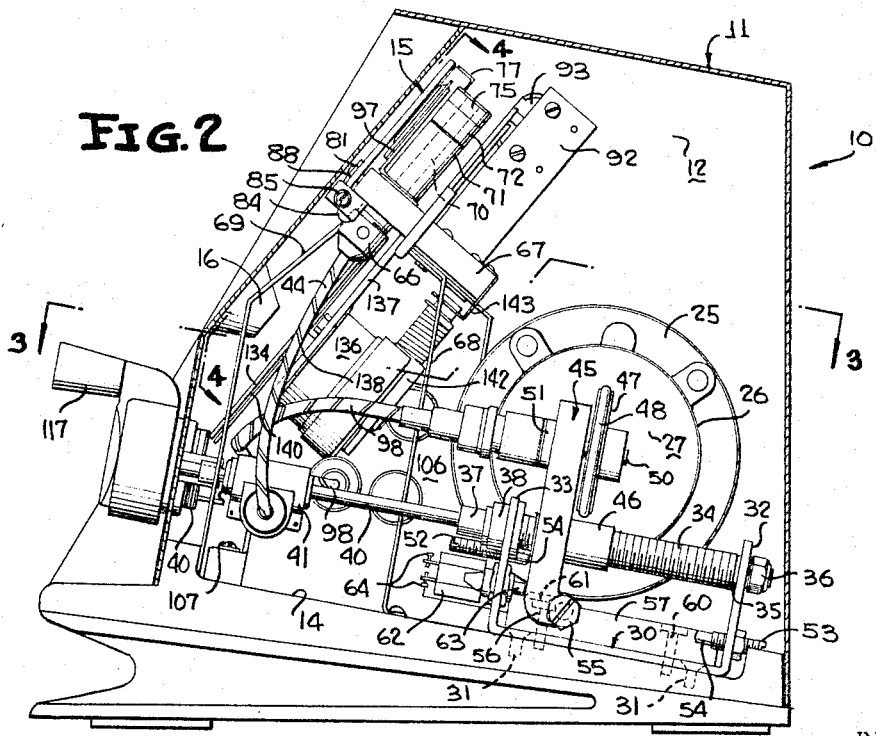
INVENTOR
ROBERT A. THIES
BY
ATTORNEYS

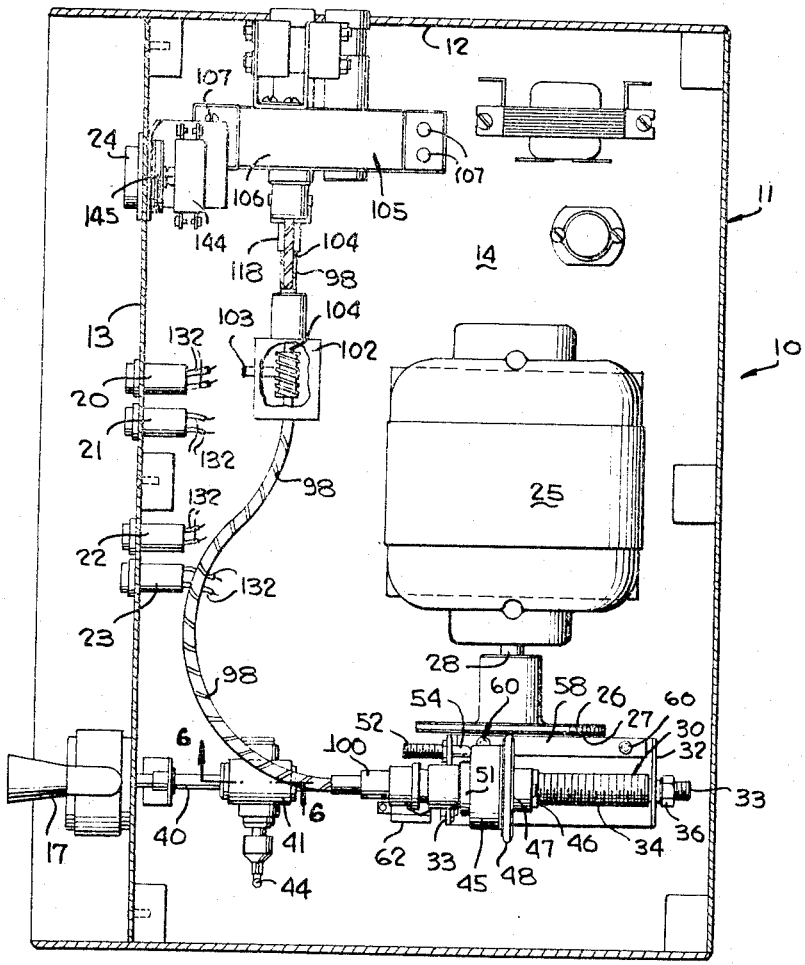

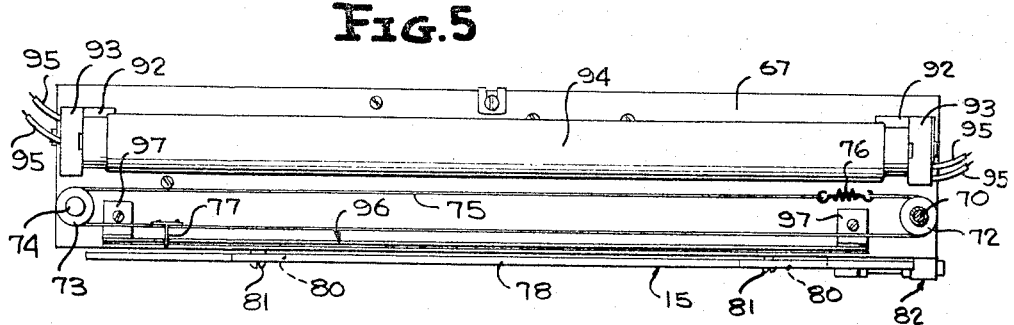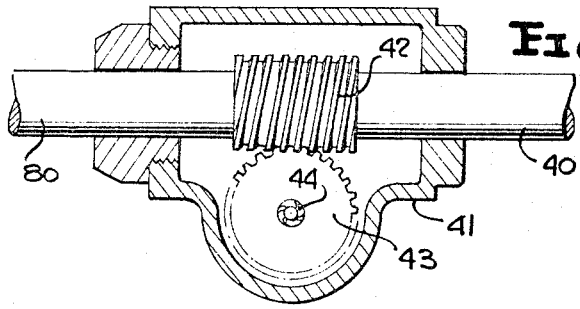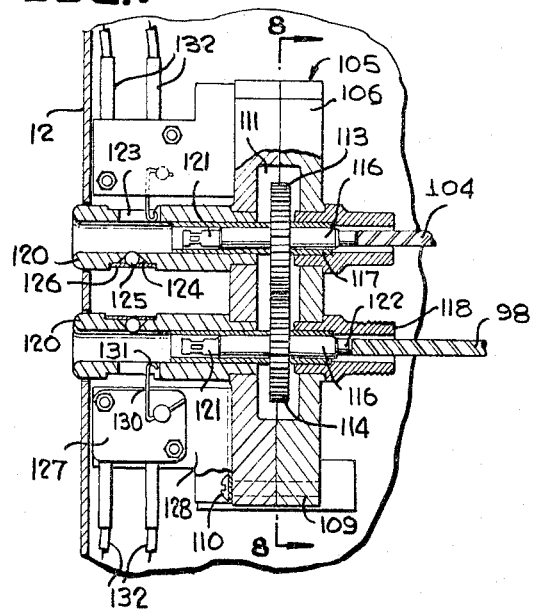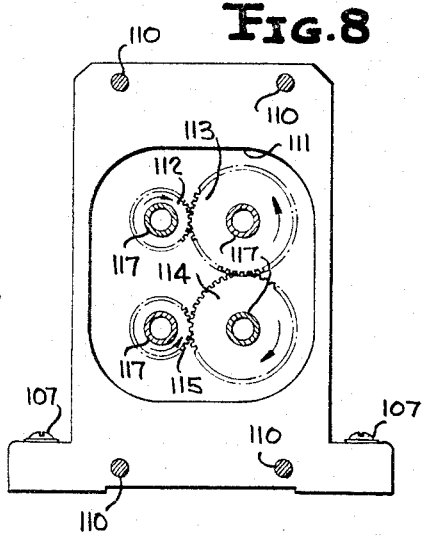
INVENTOR
ROBERT A. THIES

United States Patent Office 3,276,240
Patented Oct. 4, 1966

3,276,240
SPEED COMPARATOR
Robert A. Thies, Skokie, Ill., assignor to F. W. Stewart Corporation, a corporation of Illinois
Filed July 23, 1963, Ser. No. 296,975
13 Claims. (Cl. 73—2)

This invention relates to a novel speed comparator, and in particular, to a novel apparatus for determining the accuracy or validity of the speed or velocity indicated by any of a plurality of known speed indicating instruments such as speedometers or tachometers.

While there are many devices presently known for determining and authenticating the velocity of a member, these devices have numerous shortcomings. For example, it is well known to test or validate a speedometer by driving the speedometer and a standardized or master speedometer by a common source and compare the readings of these two speedometers. However, in a device such as this, if the master or standardized speedometer is inaccurate, the determined speed or velocity of the test speedometer will also be inaccurate. There is generally no quick way to discover if the standard or master speedometer has developed an error, or any way for this error to be corrected. Various speed validating, calibrating or comparing devices are provided with means to validate the indicated speed of the standard or master speedometer, however, these means are generally exceedingly complicated, cumbersome to operate, and generally require a skilled operator in the use of the apparatus.

Therefore, an object of this invention is to provide a novel speed or velocity comparator which includes self-calibrating means capable of accurately and efficiently authenticating the speed or velocity indicated by the speed comparator in a manner heretofore unprovided for in known speed validating devices.

Another object of this invention is the provision of a novel speed comparator including first means for providing a variable velocity, second means for providing a constant velocity, indicating means coupled to the first means for indicating the velocity thereof and calibrating means coupled between the first and second means for validating the indicated velocity of the first means by the indicating means.

Still another object of this invention is to provide a novel speed comparator including first and second means for providing respective variable and constant velocity, indicating means coupled to the first means for indicating the velocity thereof, calibrating means coupled between the first and second means for validating the indicated velocity of the first means and the indicating means also including adjusting means for adjusting the indicating means to validly indicate the velocity of the first means.

Another object of this invention is to provide a novel speed comparator of the type immediately described above, and in addition, to include a mechanism for simultaneously varying the velocity of the first means and the indication of the indicating means.

A further object of this invention is to provide a novel speed comparator including first and second means for producing respective variable and constant velocities, the first means including an output coupling adapted for engagement with a cable of a speedometer or a tachometer, indicating means coupled to the first means for indicating the velocity of the first means, calibrating means coupled between the first and second means for validating the velocity of the first means, the calibrating means including a first rotatable member coupled to the first means and a second rotatable member coupled to the second means, the rotatable members including overlapping peripheral portions, at least one aperture being provided in each of the peripheral portions of the rotatable members and a source of light directed toward the peripheral portions whereby the velocity of the first means and the validity of the indicating means can be compared.

Still another object of this invention is the provision of a novel speed comparator of the type immediately above-described in which the output coupling means of the first means includes a flexible shaft having an output end thereof connected to a speed and direction altering device, and the altering device includes a plurality of output couplings, each of which has both a different velocity and direction.

Still another object of this invention is to provide a novel speed comparator as above-noted, and in addition, to include as a part of the indicating means a movable scale and a manipulatable device for adjusting the indicating means dependent upon the output of the calibrating means.

Still another object of this invention is to provide a novel method of accurately determining the validity of the indicated velocity of a member by imparting a particular velocity to the member, obtaining an indication of the particular velocity, validating the indication of the particular velocity by a comparison of the particular velocity with a known velocity and changing the indication of the particular velocity to correspond to the known velocity.

With the above, and other objects in view that will hereinafter appear, the nature of the invention will be more clearly understood by reference to the following detailed description, the appended claims and the several views illustrated in the accompanying drawings.

In the drawings:

FIGURE 1 is a front perspective view of a novel speed comparator constructed in accordance with this invention, and illustrates a housing of the speed comparator including a front panel and a side panel, the front panel including an elongated scale, a viewing window, a speed control crank handle, four directional and ratio indicating lamps, and a push button; and the side panel including four outlet couplers or couplings.

FIGURE 2 is an enlarged vertical sectional view of the speed comparator of FIGURE 1, and illustrates a disc driven by a main motor, a friction take-off wheel normal to the disc and adjustable radially thereto, the crank handle connected by a shaft to a threaded member for adjusting the take-off wheel with respect to the disc, a flexible shaft between the shaft of the crank handle and the indicating device, a synchronous motor, a lamp, and a pair of rotatable members or discs.

FIGURE 3 is a cross-sectional view taken along line 3—3 of FIGURE 2 and shows a flexible cable connected between a speed and ratio altering gear box of which the output couplers on the side panel of the housing of FIGURE 1 form a part.

FIGURE 4 is a front elevational view taken along line 4—4 of FIGURE 2, and illustrates the elongated scale, a threaded member for adjusting the lateral position of the scale, and the two rotatable disc members.

FIGURE 5 is a top plan view of the scale of FIGURE 4, and illustrates a pointer attached to a biased cable entrained about a pair of pulleys, one of the pulleys including a flexible shaft and a fluorescent bulb mounted behind the elongated scale.

FIGURE 6 is an enlarged sectional view taken along line 6—6 of FIGURE 3 and shows a worm gear forming a part of the shaft between the crank handle and the threaded member of FIGURE 3 and the take-off gear in mesh with the worm gear.

FIGURE 7 is an enlarged fragmentary sectional view taken along line 7—7 of FIGURE 1, and illustrates two gears and two outlet couplers of the speed and ratio altering device, and a switch associated with each of the outlet couplers.

FIGURE 8 is a cross-sectional view taken along line 8—8 of FIGURE 7, and shows the intermeshing of four gears for imparting both a different speed and direction to each of the outlet couplers.

Referring to the drawings in particular, a speed comparator 10 constructed in accordance with this invention includes a housing 11 having a side panel 12, a front panel 13, and a bottom panel 14 (FIGURE 3).

The front panel 13 includes an elongated substantially rectangular indicating scale 15, a viewing window 16, a speed control crank handle 17, four direction and ratio indicating lamps 20–23 and a strobe push button 24.

With particular attention directed to FIGURES 2 and 3 of the drawings, the speed comparator 10 includes a main motor 25 secured to the bottom panel 14 of the housing 11 by suitable securing means (not shown). The main motor 25 has a speed of 1725 r.p.m. A rotatable drive disc 26 having a drive surface 27 is secured to a rotatable output shaft 28 of the main motor 25.

A substantially U-shaped upstanding support bracket 30 is secured to the bottom panel 14 of the housing 11 by a pair of identical screws 31. The U-shaped support bracket 30 includes a pair of upstanding, spaced, parallel bracket arms 32 and 33 between which is freely rotatably journalled a threaded member 34. The axis of the threaded member 34 is spaced from and parallel to the plane of the drive surface 27 of the rotatable drive disc 26. The threaded member or lead screw 34 has a reduced end portion 35 which is freely rotatably journalled in the bracket arm 32 and secured thereto by a nut 36. An opposite end portion 37 of the lead screw 34 is similarly reduced and is freely rotatably journalled in a bushing 38 of the bracket arm 33. An integral shaft 40 of the lead screw 34 is journalled in a worm gear housing 41 (see FIGURE 6), passes through the worm gear housing 41 and is connected to the speed control crank handle 17. As shown in FIGURE 6 of the drawings, a worm gear drive 42 having a ratio of 3:1 is keyed to the shaft 40 internally of the worm gear housing 41. The worm gear 42 drives or rotates a worm wheel 43 which is suitably connected to a flexible shaft 44 which extends outwardly and upwardly (as seen in FIGURE 2 of the drawings) toward the indicator scale 15 for a purpose to be hereafter described more fully.

A travelling bracket 45 having an internally threaded sleeve 46 is mounted on the lead screw 34. A friction take-off wheel 47 having a peripheral surface 48 is secured to a shaft 50 journalled in a sleeve 51 of the travelling bracket 45. The take-off wheel 47 is positioned normal to the drive surface 27 of the rotatable drive disc 26 (FIGURE 3) with the peripheral surface 48 of the take-off wheel 47 in friction contact with the drive surface 27. As the crank handle 17 is turned in a clockwise or counterclockwise direction the lead screw 34 is rotated, thereby causing the take-off wheel 47 to move along the drive surface 27 of the rotatable drive disc 26 between the axis of the drive shaft 28 and the periphery of the drive disc 26. As the take-off wheel 47 moves from the position shown in FIGURES 2 and 3 toward the periphery of the rotatable drive disc 26 the speed or velocity thereof increases, while movement from the periphery of the drive disc 26 toward the axis of the drive shaft 28 causes a coersponding decrease in the speed of the take-off wheel 47.

This movement of the take-off wheel 47 is limited by an adjustable stop 52 secured to the bracket arm 33 and a similar adjustable stop 53 secured to the bracket arm 32. Each of the adjustable stops 52 and 53 includes an identical nose 54 aligned for abutting contact with the travelling bracket 45.

The pressure of the take-off wheel 47 against the drive disc 26 is varied by a bolt 55 threadably received in a bottom portion 56 of the travelling bracket 45. The bolt 55 has one end thereof opposing a wall 57 of an upstanding elongated guide member 58 (see FIGURE 3) secured to the U-shaped bracket 30 by a pair of identical bolts 60. A suitable cushioning device may be interposed between this one end of the bolt 55 and the wall 57. One such cushioning device may include a series of rubber washers between steel washers acting against a rotatable steel ball in abutment with the wall 57. As is best illustrated in FIGURE 2, when the bolt 55 is turned in a clockwise direction, the end thereof acts through the suitable cushioning device against the wall 57 of the guide member 58 causing the travelling bracket 45 to pivot about the axis of the sleeve 46 toward the drive disc 26. Thus, this pivoting regulates the pressure of the take-off wheel 47 against the drive disc 26.

A normally closed microswitch 62 (see FIGURE 2) is secured to the bracket arm 33 of the U-shaped bracket 30. The microswitch 62 is provided with a movable switch arm 63 directed toward the travelling bracket 45 and adapted to be contacted thereby. A pair of terminals 64 of the microswitch 62 are normally biased in a closed position but are opened by the movable switch arm 63, illustrated in FIGURE 2. The purpose of the microswitch 62 is to cut off the power to the main motor 25 when the take-off wheel 47 is substantially at the axis of the rotatable drive disc 26. When the take-off wheel 47 is at the axis of the drive disc 26 the switch 62 cuts off motor 25 and an additional partial turn of the crank handle 17 allows the nose 54 of the adjustable stop 52 to abut the side of a countersink (not shown) in the bracket 45. The countersink in turn pivots the take-off wheel 47 in a direction away from the rotatable disc 26. This prevents the surface 48 of the take-off wheel 47 from becoming burnished or flattened by the disc 26 thereby precluding erratic speeds.

The speed of the take-off wheel 47 is directly dependent upon its position relative to the drive disc 26. Thus, as the take-off wheel 47 is moved with respect to the drive disc 26 by rotating the crank handle 17, the worm gear drive 42 of the shaft 40 rotates or drives the worm wheel 43 secured to the flexible shaft 44. The amount the flexible shaft 44 is rotated is thus directly dependent upon the movement of the travelling bracket 45 with respect to the lead screw 34 and the speed at which the take-off wheel 47 is rotating. By coupling the flexible shaft 44 to the indicating scale 15 in a manner to be immediately described the speed of the take-off wheel 47 at any given position along the drive surface of the drive disc 26 can be determined.

As shown in FIGURE 2, the flexible shaft 44 enters and is secured to a fitting 66 which is rotatably mounted in a substantially elongated rectangular frame 67. The frame 67 is secured by a pair of brackets 68 and 69 to the bottom panel 14 of the housing 11. The rotatable mounting of the fitting 66 is accomplished by the attachment to a shaft 70 rotatably journalled in a sleeve bearing 71 of the frame 67. A pulley 72 is secured to the shaft 70 above the sleeve bearing 71. As shown in FIG- URE 5 of the drawings, a similar pulley 73 is rotatably mounted on a shaft 74 suitably secured to the frame 67. The pulley 73 is an idle pulley while the pulley 72 is a drive pulley, driven by the flexible shaft 44. A band 75 is entrained about the pulleys 72 and 73. A tension spring 76 maintains the band 75 in intimate frictional contact with the pulleys 72 and 73. A substantially inverted J-shaped pointer 77 (see FIGURE 2) is secured to the band 75 and is movable therewith upon the rotation of the drive pulley 72.

The substantially rectangular indicating scale 15, as is best illustrated in FIGURE 4 of the drawings, includes a dial 78 provided with a pair of identical, elongated adjusting slots 80 in a lower portion thereof. An identical screw 81 passes through each of the adjusting slots 80 and is threaded into the frame 67 (see FIGURE 2). The screws 81 and the adjusting slots 80 permit the dial 78 to be moved laterally by a dial adjusting device 82 for a purpose to be hereafter explained. The dial adjusting device 82 includes a block 83 secured to the frame 67 by two identical screws 84. The block 83 carries a freely rotatable adjusting screw 85 having a threaded portion 86 received in an internally threaded socket 87 carried by a plate 88 fastened to the dial 78. The screw 85 is accessible through an opening (not shown) in the housing for moving the dial 78 laterally.

The pointer 77 can be seen or viewed through a pair of identical parallel elongated slots 90 in the dial 78. The dial 78 is calibrated for readings between 0 to 150 m.p.h. and from 0 to 5000 r.p.m. Three identical triangular calibration points 91 are located at 30 m.p.h. and 1000 r.p.m., 60 m.p.h. and 2000 r.p.m., and 120 m.p.h. and 4000 r.p.m.

A pair of identical L-shaped lamp brackets 92 (see FIGURES 2 and 5) are secured in opposed relationship on the frame 67. An identical lamp socket 93 is secured to each of the lamp brackets 92. A lamp 94 is secured between the lamp sockets 93 for illuminating the dial 78. A pair of leads 95 from each of the lamp sockets 93 connect the lamp 94 with a suitable source of electrical energy (not shown).

A mirror assembly 96 is secured to the frame 67 by a pair of identical L-shaped brackets 97, as is best illustrated in FIGURE 5 of the drawings.

Referring to FIGURES 2 and 3 of the drawings, the take-off wheel 47 drives a flexible shaft 98 through a fitting 100 journalled in the sleeve 51 of the travelling block 45. The flexible shaft 98 passes beneath a worm gear housing 102 (see FIGURES 3 and 4) and is coupled to a speed ratio and direction altering device or gear box 105.

The speed direction and ratio altering device 105 includes a housing 106 secured to the bottom panel 14 of the housing 11 by a plurality of identical screws 107. The housing 106 of the speed direction and ratio altering device 105 includes two housing portions 108 and 109 secured together by a plurality of threaded bolts 110. Each of the housing portions includes a substantially rectangular cavity 111. Four gears 112–115 are each secured to an identical shaft 116 which is freely rotatably mounted in a bearing 117. Each of the bearings 117 is mounted between an inlet coupling sleeve 118 secured to the housing portion 109 and an outlet coupling sleeve 120 secured to the housing portion 108. The shafts 116 of the gears 112–115 are each provided with an identical output coupler 121. Each of these outlet or output couplers 121 is adapted to be connected to a flexible shaft extension adapter attached to a speed indicating device such as a speedometer or tachometer.

The shaft 116 of the gear 114 has an input coupler 122 for driving connection with the flexible shaft 98, as is best shown in FIGURE 7. The flexible shaft 98 then drives the gears 112, 113 and 115 through the gear 114 in the direction of the arrows in FIGURE 8. The speed ratios of the gears 112–115 are 2:1, 1:1, 1:1 and 2:1. In effect, the gear 112 is driven clockwise at a ratio of 2:1, the gear 113 is driven counterclockwise at a ratio of 1:1, the gear 114 is a drive gear and is driven clockwise at a ratio of 1:1 while the gear 115 is driven counterclockwise at a ratio of 2:1.

A flexible shaft 104 is connected to the shaft 116 of the gear 113 and is rotated thereby in a counterclockwise direction as viewed in FIGURE 8. The flexible shaft 104 enters the worm gear housing 102 (FIGURE 3) and is secured to a worm gear 101. A worm wheel (not shown) is in mesh with the worm gear 101 to drive a solid shaft 103 at a ratio of 1.666:1 for a purpose to be described hereafter.

Each of the outlet sleeves 120 is provided with an elongated slot 123 and a diametrically opposed tapered aperture 124. A locking ball 125 is biasingly retained in each of the tapered apertures 124 by a metallic spring clip 126. An identical switch 127 is mounted adjacent each of the slots 123 by a switch bracket 128 secured to the housing portion 108 of the housing 106. Each of the switches 127 includes a switch arm 130 having an actuator portion 131 extending into and beyond each of the slots 123. A pair of identical leads 132 are connected to each of the switches 127.

The switches 127 are normally open, however, when a flexible shaft extension adapter from a speed indicating device such as a speedometer or tachometer is inserted in any one of the outlet sleeves 120, the respective switch arm 130 extending therein is tripped to a closed position. Depending upon which of the switches 127 is closed, one of the lamps 20–23 secured to the front panel 13 of the housing 11 is lighted. The lamp 20 is connected to the switch 127 associated with the gear 114, and when this switch is closed, the lamp 20 lights to indicate a clockwise rotation at a ratio of 1:1. Similarly, the lamps 21, 22 and 23 are connected to the switches 127 associated with the respective gears 112, 113 and 115. Thus, the directional rotation and the ratio of the gears 112–115 is indicated on the front panel 13 of the housing 11 when the speed comparator 10 is in operation.

As heretofore noted, the flexible shaft 104 drives a solid shaft 103 through the worm gear 101 and a worm wheel (not shown) in the worm gear housing 102. The worm gear housing 102 (see FIGURE 4) is secured to a rectangular block 132 by a pair of bolts 133. The rectangular block 132 and the worm gear housing 102 carried thereby is fastened to the frame 67 by a pair of bolts (not shown). A disc or rotatable member 134 is secured to the solid shaft 103 of the gear housing 102. The disc 134 is rotated in a counterclockwise direction by the solid shaft 103. A single aperture 135 is formed adjacent the periphery of the rotating disc 134.

A synchronous motor 136 (see FIGURE 2) is secured to the frame 67 by a substantially L-shaped bracket 137. The synchronous motor 136 has a rotatable output shaft 138 secured to a second rotatable member or disc 140. The disc 140 is provided with ten equally spaced and identical apertures 141 adjacent the periphery of the disc 140. The apertures 141 of the disc 140 and the single aperture 135 of the disc 134 arcuately coincide at a point half the distance along a line between the axes of the shafts 103 and 138. The synchronous motor 136 has a speed or velocity of 60 r.p.m. and rotates clockwise as viewed in FIGURE 4 to rotate the disc 140 clockwise. At this speed, the synchronous motor 136 rotates one revolution per second which passes ten of the apertures 141 of the disc 140 past the point of arcuate coincidence between the discs 134 and 140. This point of coincidence is directly opposite the viewing window 16 in the front panel 13 of the housing 11 as is best illustrated in FIGURE 2 of the drawings.

A lamp 142 (see FIGURE 2) is supported by a lamp bracket 143 from the frame 67. The lamp 142 is behind the discs 132 and 140, and in alignment with the arcuate point of coincidence between the discs 134 and 140 as well as the viewing window 16. The lamp 142 is connected to a suitable source of electrical energy (not shown) by way of a normally opened switch 144 (FIGURE 3) having a switch arm 145 in alignment with the strobe push button 24 of the front panel 13. Thus, when the strobe push button 24 is depressed the switch 144 is closed and the strobe lamp 142 is lighted, and the light thereof passes outwardly through the view window 16 of the front panel 13. The depression of the push button 24 also simultaneously energizes the synchronism motor 136.

To operate the speed comparator 10 to determine the speed or velocity of a speed indicating device such as a speedometer or tachometer, a flexible shaft extension adaptor of the speedometer or tachometer is first inserted into one of the sleeves 120 of the direction and ratio altering device 105 projecting outwardly from the side panel 12 of the housing 11. Alternatively, the cable of the speedometer or tachometer may be coupled to an extension adaptor, which for example may be a flexible shaft varying in distance from 30 inches to 10 feet and the extension adaptor may be coupled to any one of the output sleeves 120. Depending on which of the sleeves 120 the extension adaptor is inserted, one of the lamps 20–23 on the front panel 13 of the housing 11 will light. The particular lamp which is lighted indicates the direction as well as the ratio of any one of the associated gears 112–115.

The main motor 25 is not operating at this time since the travelling bracket 45 is in contact with the actuating arm 63 of the microswitch 62. In effect, when the travelling bracket 45 has depressed the actuating arm 63 the circuit (not shown) of the main motor 25 is opened and rotation of the disc 27 does not occur. However, as the crank handle 17 is turned, the travelling bracket 45 moves along the lead screw 34 out of contact with the switch arm 63, at which time the circuit to the main motor 25 is closed and the drive disc 26 thereof begins to rotate. As the travelling bracket 45 moves away from the axis of the drive disc 26 toward the periphery thereof, the speed may be varied between 0 to 2500 r.p.m.

During this movement of the travelling bracket 45 and the take-off wheel 47 journalled thereto along the drive disc 26, two things take place: first, as the crank handle 17 is rotated, the shaft 40 secured thereto causes rotation of the worm gear drive 42 (see FIGURE 6) which in turn, rotates the worm wheel 43. The rotation of the worm wheel 43 turns the flexible shaft 44 and the pulley 72 (FIGURE 5). As the pulley 72 is rotated the pointer 77 secured to the band 75 moves from the position illustrated in FIGURE 5 along the dial 78. The movement of the pointer 77 is directly proportional to the movement of the travelling bracket 45 and the take-off wheel 47, and thus an indication of the speed at which the take-off wheel 47 is travelling is indicated on the scale or dial 78; secondly, as the take-off wheel 47 rotates, the flexible shaft 98 secured thereto rotates the worm gear 101 through the gear 114 and 113 and the flexible shaft 104.

The gear 114 also causes rotation of the gears 112, and 115, and depending upon which of these gears the extension adaptor of the speedometer or tachometer under test is secured, such extension adaptor is rotated at a speed dependent upon the position of the take-off wheel 47 with respect to the driven disc 26. Whatever this speed is, an indication thereof on a scale of the speedometer or tachometer under test will be indicated. Presumptively, if there is no slippage between the take-off wheel 47 and the drive disc 26 and no lost motion in any of the components of the speed comparator 10, the indication on the speedometer or tachometer dial will correspond to the speed or velocity indicated by the pointer 77 of the indicating scale 15. In the absence of such errors, the speedometer or tachometer could be set to the speed or velocity indicated by the pointer 77 of the indicating scale 15. However, this is generally not the case and the speed comparator 10 is self-calibrating to eliminate any errors in the comparator system.

As the worm gear 101 is rotated by the flexible shaft 104, the solid shaft 103 driven thereby is rotated in a counterclockwise direction as indicated by the arrow on the disc 134 of FIGURE 4. It should be noted that the disc 134 rotates continuously during the rotation of the take-off wheel 47 and the speed of rotation of the disc 134 is proportional to the speed or velocity of the take-off wheel 47. To validate the speed indicated by the pointer 77 on the dial 78, the strobe push button 24 located on the front panel 13 of the housing 11 is depressed. This closes the circuit to the synchronous motor 136 and the strobe lamp 142. The synchronous motor 136 rotates the disc 140 in a clockwise direction as viewed in FIGURE 4. As the discs 134 and 140 rotate with respect to each other, the light from the strobe lamp 142 is visible through the viewing window 16 in the front panel 13 of the housing 11.

The disc 140 is a reference standard for speeds of 30, 60 and 120 m.p.h., as well as for 1000, 2000 and 4000 r.p.m. These reference standards are indicated by the triangular calibration points 91 on the dial 78 of the indicating scale 15. If the speed at which the take-off wheel 47 is rotating is 1000, 2000 or 4000 r.p.m., a stationary spot of light from the strobe lamp 142 is visible through the viewing window 16. If the disc 132 driven by the take-off wheel 47 has a velocity faster than 1000, 2000 or 4000 r.p.m. when the pointer 77 is substantially adjacent the calibrating points 91 associated with these speeds, the spot of light appearing in the view window 16 will appear to move downwardly. Similarly, if the disc 134 is moving slower at these calibration points then the disc 140, the spot of light in the view window 16 will appear to move upwardly. An upward or a downward movement of the spot of light as contrasted to a stationary spot of light indicates the take-off wheel 47 and the speedometer or tachometer driven thereby is incorrectly indicated by the pointer 77. If, however, a single spot of light is visible at any of the three calibrating points 91 at the time the pointer 77 is in direct alignment therewith, the indicated speed by the pointer 77 is accurate and the speedometer or tachometer may be compared therewith and adjusted if necessary.

However, if the speed indicated by the pointer 77 is faster or slower than the actual speed of the take-off wheel 47, the dial 77 can be adjusted or calibrated to correspond the indicated speed to the actual speed.

A preferred practice of calibrating the speed comparator 10 is to begin the calibration with the disc 134 about 500 r.p.m. faster than the speed at which the speedometer or tachometer is being tested. For example, if the speedometer or tachometer is being tested at 1000 r.p.m. or 30 m.p.h., the crank handle 17 is turned until the pointer 77 indicates 1500 r.p.m. on the dial 78. The light from the strobe lamp 142 will appear to move downward because of the faster movement of the disc 134 in relation to the disc 140. The crank handle 17 is then turned to bring the pointer 77 from the indicated 1500 r.p.m. toward 1000 r.p.m. When the spot of light ceases to move downwardly and remains stationary, the pointer 77 should be directly in line with the triangular point 91, indicating 1000 r.p.m. and 30 m.p.h. If the pointer 77 is either above or below the calibration point 91 when the spot of light viewed through the view window 16 is stationary, the dial 78 must be adjusted to indicate 30 m.p.h. and 1000 r.p.m.

This adjustment of the dial 78 is accomplished by unthreading the screws 81 slightly to allow the dial 78 to be shifted laterally, as is best illustrated in FIGURE 4 of the drawings. Alternatively, the screws 81 may originally be tightened sufficiently to allow the dial 78 to move or slide without the screws 81 being loosened. This latter practice is preferable where the dial 78 is not readily accessible through the front panel 13 of the housing 11.

In either event, after the screws 81 have been loosened or are set originally an amount sufficient to allow lateral movement of the dial 78, the bolt 85 is rotated in either a clockwise or counterclockwise direction. As heretofore noted, the bolt 85 is accessible through the side panel of the housing 11. By turning the bolt 85 the scale or dial 78 may be shifted laterally with respect to the now stationary pointer 77 to correspond the pointer 77 to the true speed of the take-off wheel 47. That is, the dial 78 is shifted from left-to-right or from right-to-left as viewed in FIGURE 4 until the pointer 77 indicates 1000 r.p.m. and 30 m.p.h. At this point, the velocity indicated by the pointer 77 is exactly the velocity of the speed at which the speedometer or tachometer is being driven. Any difference between the speed indicated by the speedometer or tachometer and the speed indicated by the pointer 77 may then be compensated for by adjusting the speedometer or tachometer in a manner well known in the prior art.

While the validation and calibration of the speed comparator 10 has been discussed in connection with a selected speed of 1000 r.p.m., it should be noted that a similar calibration can be accomplished at speeds of 2000 r.p.m. and 4000 r.p.m.

While an example of the preferred form of the speed comparator is disclosed herein, it is to be understood that variations in the components and elements thereof may be made without departing from the spirit and scope of this invention as defined in the appended claims.

I claim:

1. A speed comparator comprising a support, first means for providing a variable velocity, said first means including an output shaft, second means for providing a constant velocity, said second means including an output shaft, indicating means coupled to said first means for indicating the velocity thereof, calibrating means coupled between said first and second means for validating the indicated velocity of said first means as indicated by said indicating means, said indicating means including an indicia bearing member and a movable pointer, means coupling said output shaft of said first means to said movable pointer, and adjusting means for adjustably positioning the indicia bearing member relative to the support to validly indicate the velocity of the first means as determined by said calibrating means, said indicating means includes adjusting means for adjusting the indicating means to validly indicate the velocity of said first means.

2. A speed comparator comprising first means for providing a variable velocity, second means for providing a constant velocity, said first means including output means adapted for coupling engagement with a speedometer cable, indicating means coupled to said first means for indicating the velocity of the first means, calibrating means coupled between said first and second means for validating the velocity of said first means, said calibrating means including a first rotatable member coupled to said first means and a second rotatable member coupled to said second means, said rotatable members being discs having axes offset from each other a distance at least equal to the radius of one of said discs, said rotatable members including overlapping peripheral portions, at least one aperture in each peripheral portion of each of the rotatable members and means for directing a light source toward the peripheral portions whereby the velocity of the first means and the validity of the indicating means can be compared.

3. The speed comparator as defined in claim 2 wherein the indicating means includes adjusting means for adjusting the indicating means to validly indicate the velocity of said first means.

4. The speed comparator as defined in claim 2 wherein the output means of said first means includes means for altering the direction and velocity of said first means.

5. A speed comparator including a motor, said motor including a rotatable shaft having a disc secured thereto, a take-off wheel contacting said disc, adjusting means for moving the take-off wheel with respect to the disc, said adjusting means including a rotatable member, a second rotatable member coupled to said first rotatable member and an indicating device coupled to said second rotatable member whereby rotation of the first rotatable member moves the take-off wheel with respect to the disc and varies the indication of the indicating device, a constant speed motor, means for comparing the speeds of said motors, and means for adjusting the indicating device dependent upon the comparison of the speeds of said motors.

6. The speed comparator as defined in claim 5 wherein the indicating device includes a movable scale and the means for adjusting the indicating device is manipulatably coupled to the movable scale.

7. The speed comparator as defined in claim 6 wherein a flexible shaft is secured to said take-off wheel, and the comparison means is coupled between the flexible shaft and the constant speed motor.

8. The speed comparator as defined in claim 6 wherein the flexible shaft has an output end connected to a speed and direction altering device, and said altering device includes a plurality of rotatable output coupling means, each of the coupling means being rotatable at a different speed and at least two of said coupling means being rotatable in a different direction.

9. The speed comparator as defined in claim 1 wherein said coupling means includes a flexible member, handle means coupled to said flexible member for rotating said flexible member to move said movable pointer, and means coupled between said handle means, said flexible member and said first means for simultaneously varying the velocity of the output shaft of said first means and indicating the velocity of said last-mentioned output shaft by said movable pointer.

10. The speed comparator as defined in claim 5 wherein said take-off wheel adjusting means includes a bracket supporting said take-off wheel in contacting relationship with said disc, said bracket being mounted for pivoting movement in a plane normal to the axis of said take-off wheel, and means for adjusting the pivotal position of the bracket relative to the disc for regulating the pressure between the disc and the take-off wheel.

11. A speed comparator comprising first means for providing a variable velocity, second means for providing a constant velocity, said first means including output means adapted for coupling engagement with a speedometer cable, movable means coupled to said first means for varying the velocity thereof, indicating means including an indicia bearing member and a movable pointer, means coupling said movable means to said movable pointer whereby the velocity of said first means and the indication thereof by said pointer is effective simultaneously by the movement of said movable means, calibrating means coupled between said first and second means for validating the velocity of said first means, said calibrating means including a first rotatable member coupled to said first means and a second rotatable member coupled to said second means, said rotatable members being discs having shafts whose axes are offset a distance at least equal to the radius of one of said discs, means coupling the shaft of one of said discs to said first means, a constant speed motor connected to the other of said disc shafts, said discs having peripheral portions in overlapped relationship, at least one aperture in each peripheral portion of the disc, and a light source adjacent the overlapped peripheral portions of the discs whereby the velocity of the first means and the validity of the indicating means can be compared.

12. The speed comparator as defined in claim 11 including a housing in which said indicia bearing means is supported, and screw adjusting means connected to said indicia bearing member and projecting outwardly of said housing whereby said indicia bearing member can be adjusted relative to said pointer from the exterior of said housing.

13. The speed comparator as defined in claim 11 wherein said first means includes a friction disc, a take-off wheel adjustably mounted relative to the friction disc, the output means of said first means including a flexible member connected to said take-off wheel, said flexible member having an output end connected to a speed and direction altering device, and said speed and direction altering device including a plurality of rotatable output coupling means, each of the coupling means being rotatable at a different speed and at least two of said coupling means being rotatable in a different direction.

References Cited by the Examiner

UNITED STATES PATENTS

| | | | |
|---|---|---|---|
| 1,244,023 | 10/1917 | Bowen | 73—2 |
| 1,613,727 | 1/1927 | Schmidt | 73—2 |
| 2,127,272 | 8/1938 | Schweisthal. | |
| 2,207,464 | 7/1940 | Lawson | 88—14 X |
| 2,398,235 | 4/1946 | Luenberger | 116—115.5 X |
| 2,434,497 | 1/1948 | Kearsley | 74—194 X |
| 2,493,028 | 1/1950 | Putt | 73—2 |

FOREIGN PATENTS 146,819  11/1902  Germany.

LOUIS R. PRINCE, *Primary Examiner.*

S. C. SWISHER, *Assistant Examiner.*